United States Patent
Terazawa et al.

(10) Patent No.: US 8,312,689 B2
(45) Date of Patent: Nov. 20, 2012

(54) WEATHER STRIP STRUCTURE

(75) Inventors: Masao Terazawa, Nishikamo-gun (JP); Takashi Hashimoto, Nagoya (JP); Akihiko Asakura, Toyota (JP); Satoshi Osanai, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 841 days.

(21) Appl. No.: 12/110,761

(22) Filed: Apr. 28, 2008

(65) Prior Publication Data

US 2008/0289285 A1 Nov. 27, 2008

(30) Foreign Application Priority Data

May 25, 2007 (JP) .................................. 2007-139167

(51) Int. Cl.
*E04C 2/38* (2006.01)
(52) U.S. Cl. ............... 52/716.5; 52/717.01; 52/204.69; 52/208; 296/84.1; 296/146.15
(58) Field of Classification Search ............. 52/717.01, 52/716.5, 716.8, 716.2, 204.69, 208, 204.53, 52/204.5, 204.369, 204.62, 716.1, 717.03, 52/717.04, 717.05; 296/84.1, 146.14, 146.15, 296/96.21
See application file for complete search history.

(56) References Cited

U.S. PATENT DOCUMENTS

| | | | | |
|---|---|---|---|---|
| 3,333,364 A | * | 8/1967 | Herr | 49/441 |
| 3,436,891 A | * | 4/1969 | Church | 52/716.5 |
| 3,456,410 A | * | 7/1969 | Johnson et al. | 52/309.1 |
| 3,638,361 A | * | 2/1972 | Church | 49/479.1 |
| 3,939,608 A | * | 2/1976 | Asakai et al. | 49/493.1 |
| 4,007,536 A | * | 2/1977 | Soderberg | 29/421.1 |
| 4,067,146 A | * | 1/1978 | Mesnel et al. | 49/490.1 |
| 4,143,497 A | * | 3/1979 | Offenbacher | 52/204.597 |
| 4,343,121 A | * | 8/1982 | Kruschwitz et al. | 52/208 |
| 4,347,693 A | * | 9/1982 | Kruschwitz | 52/208 |
| 4,348,443 A | * | 9/1982 | Hein | 428/122 |
| 4,432,166 A | * | 2/1984 | Weimar | 49/490.1 |
| 4,483,113 A | * | 11/1984 | Kruschwitz | 52/208 |
| 4,571,278 A | * | 2/1986 | Kunert | 156/108 |
| 4,621,469 A | * | 11/1986 | Kruschwitz | 52/208 |
| 4,627,145 A | * | 12/1986 | Niemanns | 29/450 |
| 4,695,499 A | * | 9/1987 | Whitener | 428/122 |
| 4,708,898 A | * | 11/1987 | Gommier et al. | 428/36.9 |
| 4,745,016 A | * | 5/1988 | Hashimoto et al. | 428/122 |
| 4,756,944 A | * | 7/1988 | Kisanuki | 428/122 |

(Continued)

FOREIGN PATENT DOCUMENTS

JP 58-33352 3/1983

(Continued)

*Primary Examiner* — William Gilbert
*Assistant Examiner* — James Ference
(74) *Attorney, Agent, or Firm* — Oblon, Spivak, McClelland, Maier & Neustadt, L.L.P.

(57) ABSTRACT

A weather strip includes a bottom wall that faces or is in contact with an end face of a fixed window glass that closes a window opening of a side door. An outer wall extends from the bottom wall on an outer side of the vehicle body with respect to the fixed window glass, and an inner wall extends from the bottom wall on an inner side of the vehicle body with respect to the fixed window glass so that the inner wall and the outer wall sandwich a peripheral portion of the fixed window glass in a thickness direction. The inner wall is provided with a spacing groove for creating a space between the fixed window glass and the inner wall.

17 Claims, 6 Drawing Sheets

U.S. PATENT DOCUMENTS

| | | | | |
|---|---|---|---|---|
| 4,769,947 A * | 9/1988 | Ogawa et al. | | 49/479.1 |
| 4,835,031 A * | 5/1989 | Schroder et al. | | 428/122 |
| 4,869,945 A * | 9/1989 | Harney | | 428/122 |
| 4,884,370 A * | 12/1989 | Nozaki et al. | | 49/479.1 |
| 4,894,968 A * | 1/1990 | Vaughan | | 52/204.597 |
| 4,949,524 A * | 8/1990 | Martin et al. | | 52/716.5 |
| 4,952,442 A * | 8/1990 | Warner | | 428/83 |
| 4,977,706 A * | 12/1990 | Kisanuki | | 49/479.1 |
| 5,035,937 A * | 7/1991 | Nozaki | | 428/122 |
| 5,062,248 A * | 11/1991 | Kunert | | 52/208 |
| 5,095,669 A * | 3/1992 | Kunert et al. | | 52/208 |
| 5,122,406 A * | 6/1992 | Sakamaki et al. | | 428/122 |
| 5,127,193 A * | 7/1992 | Okada et al. | | 49/495.1 |
| 5,147,105 A * | 9/1992 | Ono et al. | | 296/146.9 |
| 5,154,028 A * | 10/1992 | Hill et al. | | 52/208 |
| 5,248,179 A * | 9/1993 | Biermacher et al. | | 296/146.15 |
| 5,258,157 A * | 11/1993 | Nozaki et al. | | 264/261 |
| 5,261,721 A * | 11/1993 | Conger et al. | | 296/146.15 |
| 5,296,067 A * | 3/1994 | Mesnel et al. | | 156/221 |
| 5,316,829 A * | 5/1994 | Cordes et al. | | 428/192 |
| 5,338,087 A * | 8/1994 | Gross et al. | | 296/146.15 |
| 5,345,717 A * | 9/1994 | Mori et al. | | 49/404 |
| 5,384,995 A * | 1/1995 | Kunert et al. | | 52/394 |
| 5,413,397 A * | 5/1995 | Gold | | 296/146.15 |
| 5,437,124 A * | 8/1995 | Ahlfeld et al. | | 49/479.1 |
| 5,437,131 A * | 8/1995 | Tamura | | 52/716.6 |
| 5,449,217 A * | 9/1995 | Takahashi | | 296/146.15 |
| 5,480,207 A * | 1/1996 | Gold | | 296/93 |
| 5,519,979 A * | 5/1996 | Kunert et al. | | 52/745.15 |
| 5,584,526 A * | 12/1996 | Soldner | | 296/146.15 |
| 5,603,546 A * | 2/1997 | Desir, Sr. | | 296/93 |
| 5,618,608 A * | 4/1997 | Teishi | | 428/122 |
| 5,624,148 A * | 4/1997 | Young et al. | | 296/93 |
| 5,626,383 A * | 5/1997 | Lee et al. | | 296/146.9 |
| 5,723,196 A * | 3/1998 | Cornils et al. | | 428/122 |
| 5,732,998 A * | 3/1998 | Otsuka et al. | | 296/208 |
| 5,755,071 A * | 5/1998 | Drozd | | 52/716.8 |
| 5,806,257 A * | 9/1998 | Cornils et al. | | 52/208 |
| 5,842,731 A * | 12/1998 | Gold | | 296/93 |
| 5,864,996 A * | 2/1999 | Veldman et al. | | 52/204.597 |
| 5,897,937 A * | 4/1999 | Cornils et al. | | 156/242 |
| 5,927,040 A * | 7/1999 | Kuwabara | | 52/716.8 |
| 5,970,659 A * | 10/1999 | Oord | | 49/377 |
| 6,238,769 B1 * | 5/2001 | Nishio et al. | | 428/120 |
| 6,395,355 B1 * | 5/2002 | Nakajima et al. | | 428/34.1 |
| 6,460,300 B2 * | 10/2002 | Mikkaichi et al. | | 52/204.597 |
| 6,716,496 B2 * | 4/2004 | Nakajima et al. | | 428/34.1 |
| 6,810,635 B2 * | 11/2004 | Meizlish | | 52/716.5 |
| 6,898,916 B2 * | 5/2005 | Kobayashi et al. | | 52/717.04 |
| 6,922,945 B2 * | 8/2005 | Dron | | 49/477.1 |
| 6,944,917 B2 * | 9/2005 | Yanagita et al. | | 24/292 |
| 7,124,539 B2 * | 10/2006 | Tsuchida et al. | | 49/490.1 |
| 7,210,729 B2 * | 5/2007 | Hammaker et al. | | 296/146.15 |
| 7,905,071 B2 * | 3/2011 | Laconte | | 52/717.01 |
| 2001/0003233 A1 * | 6/2001 | Mikkaichi et al. | | 52/208 |
| 2003/0090122 A1 * | 5/2003 | Meizlish | | 296/93 |
| 2006/0001290 A1 * | 1/2006 | Hammaker et al. | | 296/146.15 |

FOREIGN PATENT DOCUMENTS

| | | |
|---|---|---|
| JP | 59-114123 | 7/1984 |
| JP | 63-11417 | 1/1988 |
| JP | 63-156812 | 10/1988 |
| JP | 2001-163061 | 6/2001 |
| JP | 2005-153751 | 6/2005 |
| JP | 2006-123633 | 5/2006 |

* cited by examiner

WEATHER STRIP STRUCTURE

INCORPORATION BY REFERENCE

This document claims priority to Japanese Patent Application No. 2007-139167, filed on May 25, 2007, the entire content of which is hereby incorporated by reference.

BACKGROUND OF THE INVENTION

1. Field of the Invention

The invention relates to a weather strip structure for sealing between a vehicle body and a window glass, for example a glass that is fixedly provided in a door of a vehicle.

2. Description of the Related Art

Patent Application Publication No. 2006-123633 (JP-A-2006-123633) discloses an example of a weather strip that is fitted onto the periphery of a fixed window glass fixed in a side door of a vehicle. With this arrangement, the degree of sealing around the fixed window glass is increased by narrowing the opening width on the open-end side of the weather strip as compared to the internal width on the bottom side of the strip.

However, in the arrangement described above, the degree of sealing is increased by merely increasing the contact pressure against the window glass on the open end side, which can limit the ability to increase the degree of sealing between the weather strip and the window glass.

SUMMARY OF THE INVENTION

A weather strip structure according to a first feature or example of an embodiment of the invention includes a bottom wall that faces or is in contact with an end face of a window glass that is fixedly held in a position such that a window opening of a vehicle body is closed. An outer wall of the weather strip extends from the bottom wall on an outer side of the vehicle body with respect to the window glass, and an inner wall extends from the bottom wall on an inner side of the vehicle body with respect to the window glass so that the inner wall and the outer wall sandwich a peripheral portion of the window glass in a thickness direction of the glass. In addition, a side groove is provided in at least one of the outer wall or the inner wall to provide a space between the window glass and the at least one of the outer wall or the inner wall. The space extends continuously or intermittently along the peripheral portion of the window glass.

According to the feature or example embodiment described above, the bottom wall, the outer wall and the inner wall produce a substantially C-shaped cross section, and the weather strip seals the channel around the window glass (along the surface thereof), by sandwiching the peripheral portion of the window glass between the outer wall and the inner wall. In this sealed state, a gap (space) is created by the side groove between the window glass and the at least one of the outer wall or the inner wall. Thus, with the present weather strip structure, entrance of water into the interface between the window glass and the outer wall or the inner wall due to capillarity, for example, is effectively prevented. In other words, it is possible to effectively prevent water from entering the inside of the vehicle through the interface between the weather strip and the window glass.

A weather strip structure according to a second feature or example of an embodiment of the invention includes a bottom wall that faces or is in contact with an end face of a window glass that is fixedly held in a position such that a window opening of a vehicle body is closed. An outer wall extends from the bottom wall on an outer side of the vehicle body with respect to the window glass, and an inner wall extends from the bottom wall on an inner side of the vehicle body with respect to the window glass so that the inner wall and the outer wall sandwich a peripheral portion of the window glass in a thickness direction. In addition, a lip is provided on at least one of the outer wall or the inner wall between the bottom wall and a free end of the at least one of the outer wall or the inner wall. Where the lip protrudes from a side of the at least one of the outer wall or the inner wall which faces the window glass.

According to the second feature or example embodiment described above, the bottom wall, the outer wall and the inner wall produce a substantially C-shaped cross section, and the weather strip seals the channel around the window glass (along the surface thereof), by sandwiching the peripheral portion of the window glass between the outer wall and the inner wall. In this sealed state, the lip protruding from one or each of the outer wall and the inner wall is in pressure contact (elastic contact) with the window glass. Thus, with the present weather strip structure, higher sealing pressure against the window glass is achieved, and the degree of sealing the water entrance channel between the weather strip and the window glass is increased. In particular, because the lip disposed between the bottom wall and the free end of the outer wall or the inner wall is not exposed on the open end side of the weather strip structure, the sealing portion is protected, and the lip can exhibit the required degree of sealing. Thus, it is possible to effectively prevent water from entering into the inside of the vehicle through the interface between the weather strip and the window glass.

With the above features, because a seal is provided at a location spaced from the open end of the weather strip, this seal can avoid the high pressures to which the open end (at the free ends of the inner and outer walls) might be exposed, and thus sealing is improved. However, under certain conditions, water could nevertheless pass through the improved seal arrangement. Thus, as an alternative to the above improved seal features, or more preferably in addition to one or more of the improved seal features, the present invention also provides improved arrangements for handling water that could pass between the window glass and one of the walls of the weather strip structure. Such additional or alternate features can include, for example, a drainage through hole and/or a drainage groove as discussed herein.

A weather strip structure according to a third feature or example of an embodiment of the invention includes a bottom wall that faces or is in contact with a lower end face, in terms of a height direction with respect to a vehicle body, of a window glass that is fixedly held in a position such that a window opening of the vehicle body is closed. An outer wall extends from the bottom wall on an outer side of the vehicle body with respect to the window glass, and an inner wall extends from the bottom wall on an inner side of the vehicle body with respect to the window glass so that the inner wall and the outer wall sandwich a peripheral portion of the window glass in a thickness direction. In addition, a through hole is provided in the bottom wall. The hole passes through the bottom wall, and is at least partially offset toward an outside of the vehicle body with respect to the window glass.

According to the third feature or example described above, the bottom wall, the outer wall and the inner wall produce a substantially C-shaped cross section, and the weather strip seals the channel at a lower portion of the window glass (along the surface thereof), by sandwiching a lower edge portion of the window glass between the outer wall and the inner wall. The water that enters through the interface between the outer wall and the window glass is drained out through the through hole in the bottom wall. In a preferred example of the present weather strip structure, the through hole is offset toward the outside of the vehicle body with respect to the lower end face of the window glass, which prevents the end face of the window glass from closing the through hole. Thus, with the present weather strip structure, required drainage capacity provided by the through hole is ensured. Accordingly, it is possible to effectively prevent water from entering the inside of the vehicle through the interface between the weather strip and the window glass.

A weather strip structure according to a fourth feature or example of an embodiment of the invention includes a bottom wall that faces or is in contact with an end face of a window glass that is held in a position such that a window opening of a vehicle body is closed. An outer wall extends from the bottom wall on an outer side of the vehicle body with respect to the window glass, and an inner wall extends from the bottom wall on an inner side of the vehicle body with respect to the window glass so that the inner wall and the outer wall sandwich a peripheral portion of the window glass in a thickness direction. In addition, a through hole is provided in the bottom wall and passes through the bottom wall. Further, a bottom groove is provided in the bottom wall. The groove opens in a direction of the end face of the window glass, and communicates with the through hole.

According to the fourth feature or example described above, the bottom wall, the outer wall and the inner wall produce a substantially C-shaped cross section, and the weather strip seals the channel at a lower portion of the window glass (along the surface thereof), by sandwiching a lower edge portion of the window glass between the outer wall and the inner wall. The water that enters through the interface between the outer wall and the window glass is led to the through hole via the bottom groove and is drained out through the through hole. In the present weather strip structure, the bottom wall (the part thereof between the inner and outer walls) that has substantially the same width as that of the window glass is provided with the bottom groove (for example in the form of a concave portion), which prevents the lower end portion of the window glass from occupying the bottom groove. Thus, with the present weather strip structure, required drainage capacity provided by the bottom groove and the through hole is ensured. Accordingly, it is possible to effectively prevent water from entering the inside of the vehicle through the interface between the weather strip and the window glass.

A weather strip structure according to a fifth feature or example of an embodiment of the invention includes a bottom wall that faces or is in contact with an end face of a window glass that is held in a position such that a window opening of a vehicle body is closed. An outer wall extends from the bottom wall on an outer side of the vehicle body with respect to the window glass, and an inner wall extends from the bottom wall on an inner side of the vehicle body with respect to the window glass so that the inner wall and the outer wall sandwich a peripheral portion of the window glass in a thickness direction. The bottom wall includes a first portion and a second portion, and wherein a groove is provided in the second portion, and further wherein at least part of the groove is spaced further from the window glass than at least part of the first portion such that if the window glass contacts the at least part of the first portion a space is maintained between the window glass and the bottom wall in the groove. In addition, a through hole that passes through the weather strip, wherein the through hole is in communication with the groove.

As described above, with the weather strip structure according to the invention, it is possible to effectively prevent water from entering the inside of the vehicle through the interface between the weather strip and the window glass.

As should be apparent, the invention can provide a number of advantageous features and benefits. It is to be understood that, in practicing the invention, an embodiment can be constructed to include one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
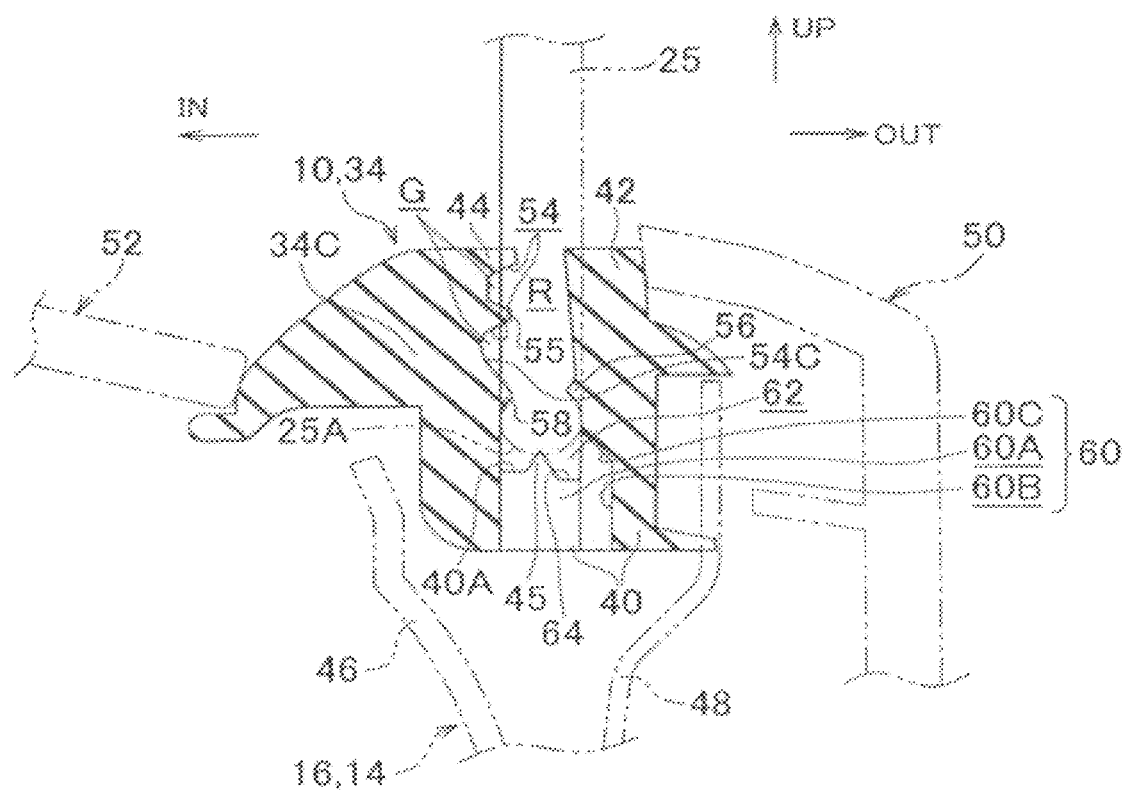
FIG. 1 is a sectional view, taken along the line 1-1 of FIG. 3, showing a main portion of a weather strip according to an embodiment of the invention.

Referring now to the drawings, like reference numerals are utilized to designate identical or corresponding parts throughout the several views.

A weather strip 10 which includes a weather strip structure according to an example of an embodiment of the invention will be described with reference to FIGS. 1 to 5. The arrow FR (FIGS. 3 and 5) drawn in the figures as appropriate indicates the forward direction of the longitudinal (travel) directions with respect to a vehicle body of an automobile A. The arrow UP indicates the upward direction of the height directions with respect to the vehicle body. The arrow IN indicates the inward direction along the vehicle width direction, and the arrow OUT indicates the outward direction along the vehicle width direction.

Figure 5:
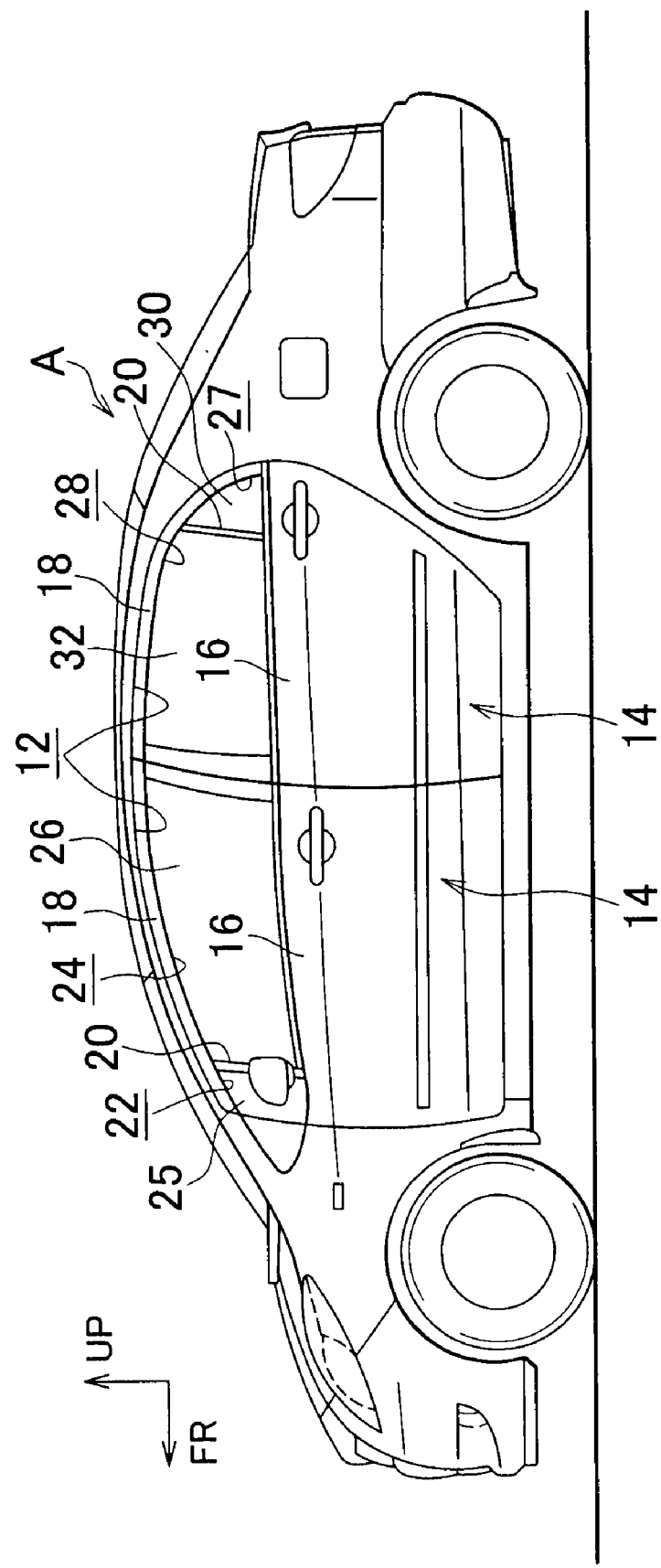
FIG. 5 is a side view of an automobile in which the weather strip according to the embodiment of the invention is used.

In FIG. 5, a schematic overall configuration of the automobile A in which the weather strip 10 is used is shown in side view. As shown in this figure, the automobile A has side doors 14 for closing openings 12 through which occupants get in and out of the automobile A. In this embodiment, front and rear side doors 14 are provided, which open and close the openings 12 arranged in the vehicle-body longitudinal direction. A door frame 18, which forms a frame-like structure along with a door body 16, is provided in the upper portion of each side door 14, and the area surrounded by the frame-like structure is divided into front and rear portions with respect to the vehicle body by a division bar 20.

Specifically, in the front, side door 14, a window opening 22 is formed on the front side of the division bar 20 with respect to the vehicle body, and a window opening 24 is formed on the rear side of the division bar 20 with respect to the vehicle body. The window opening 22 is closed by a fixed window glass 25, and the window opening 24 can be opened and closed by a side window glass 26 that moves up and down.

Similarly, in the rear, side door 14, a window opening 27 is formed on the rear side of the division bar 20 with respect to the vehicle body, and a window opening 28 is formed on the front side of the division bar 20 with respect to the vehicle body. The window opening 27 is closed by a fixed window glass 30, and the window opening 28 can be opened and closed by a side window glass 32 that moves up and down.

The weather strips 10 are fitted onto the periphery of the fixed window glasses 25 and 30, and are used as the seals between each of the fixed window glasses 25 and 30 and the door body 16 (belt line portion), the door frame 18 and the division bar 20 of the side door 14, which serves as the vehicle body according to the example of the invention. The weather strips 10 for use with the fixed window glasses 25 and 30 (the characteristic portions of the weather strips 10) have basically the same structure, and in the following description, an example of the weather strip for use with the fixed window glass 25 will be described.

Figure 3:
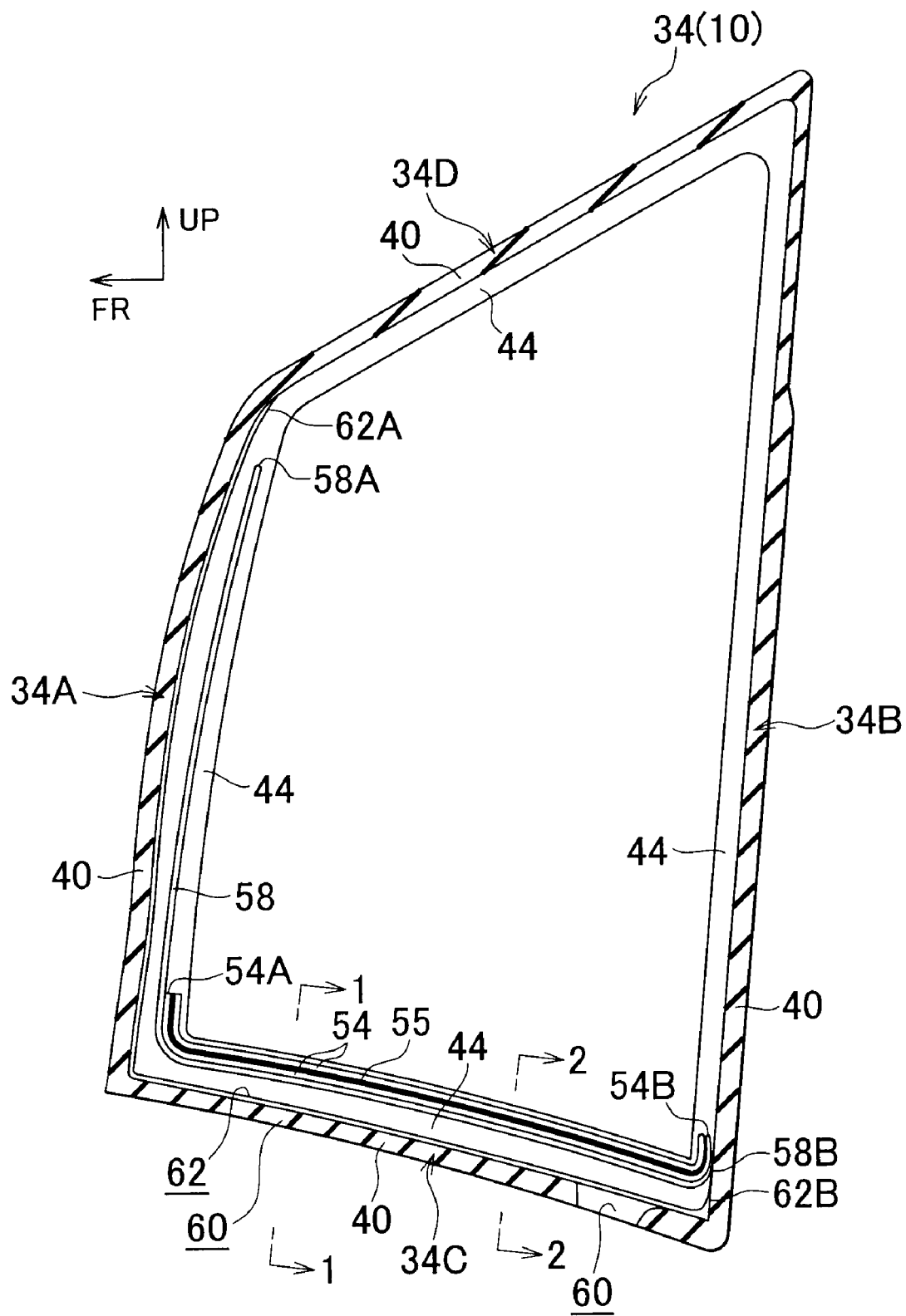
FIG. 3 is a side view showing a main portion of the weather strip according to the embodiment of the invention, in which the weather strip is partially cut away.
Figure 4:
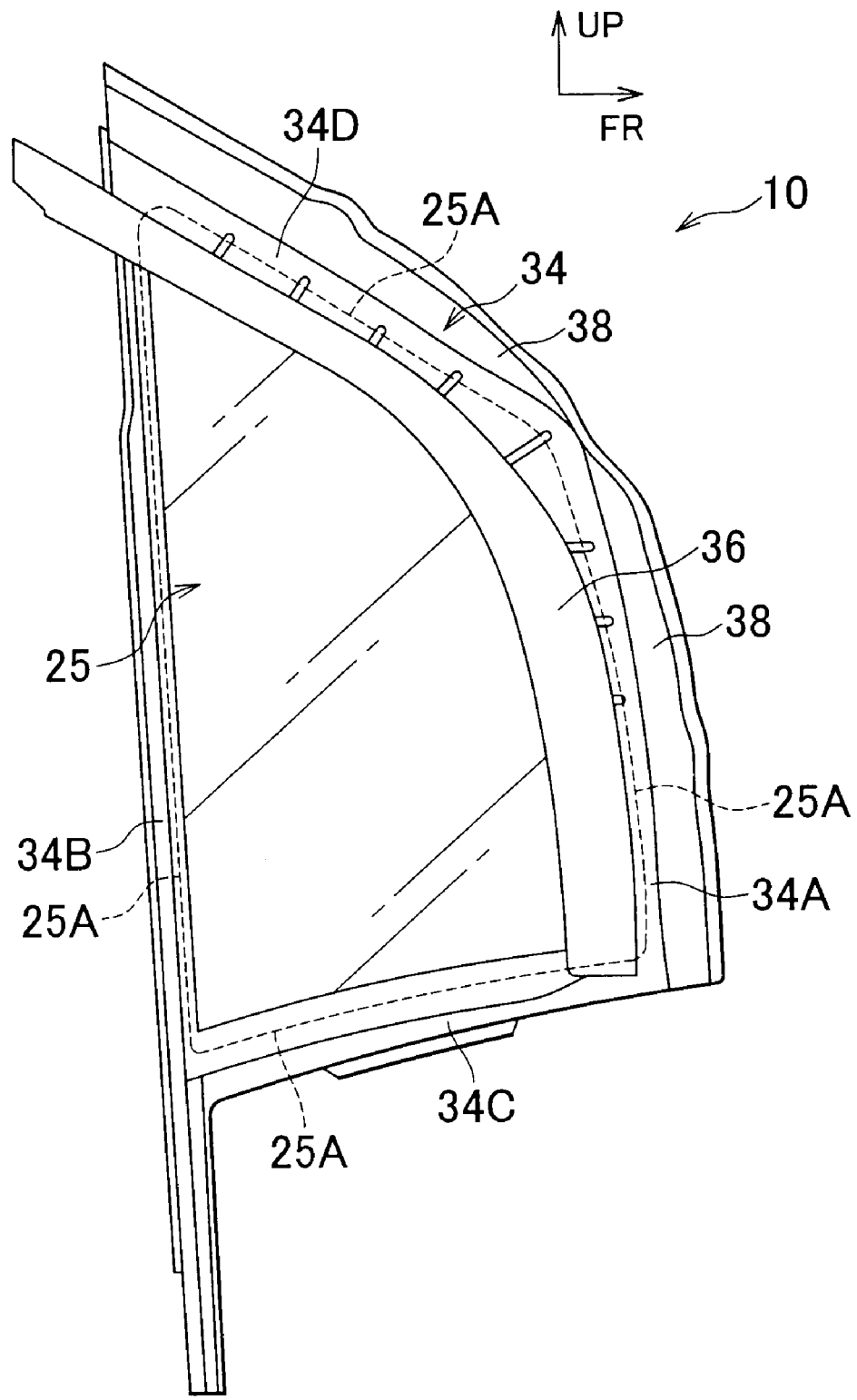
FIG. 4 is a side view showing a state in which the weather strip according to the embodiment of the invention is fitted onto a fixed window glass.

The example illustrated in FIG. 4 shows the weather strip 10 fitted onto the fixed window glass 25 in side view viewed from the inner, passenger compartment side (for right side steering) or driver side (for left side steering). A similar (or mirror image) arrangement would typically be provided on the opposite side of the vehicle. As shown in FIG. 4, the weather strip 10 includes a frame-like portion 34 that has a frame-like shape substantially corresponding to the window opening 22. As shown in FIG. 3 in which an outer wall 42 and a lip 45 described later are omitted, the frame-like portion 34 is mainly constituted of front and rear portions 34A and 34B, a lower portion 34C and an upper portion 34D. The front and rear portions 34A and 34B extend in the height direction with respect to the vehicle body. The lower portion 34C extends in the vehicle-body longitudinal direction and connects the lower ends of the front and rear portions 34A and 34B. The upper portion 34D connects the upper ends of the front and rear portions 34A and 34B and is inclined in the vehicle-body longitudinal direction and in the height direction with respect to the vehicle body so that the front end of the upper portion 34D is located lower than the rear end thereof.

As shown in FIG. 4, a lip portion 36 for sealing between the fixed window glass 25 and an inner panel, which is a constituent element of the side door 14, extends from the front portion 34A and the upper portion 34D inwardly with respect to the vehicle width direction. A sealing lip 38 for sealing between the fixed window glass 25 and a sash (not shown) extends forward and upward.

The weather strip 10 is fitted onto the periphery of the fixed window glass 25 in the frame-like portion 34. This will be more specifically described below.

Figure 2:
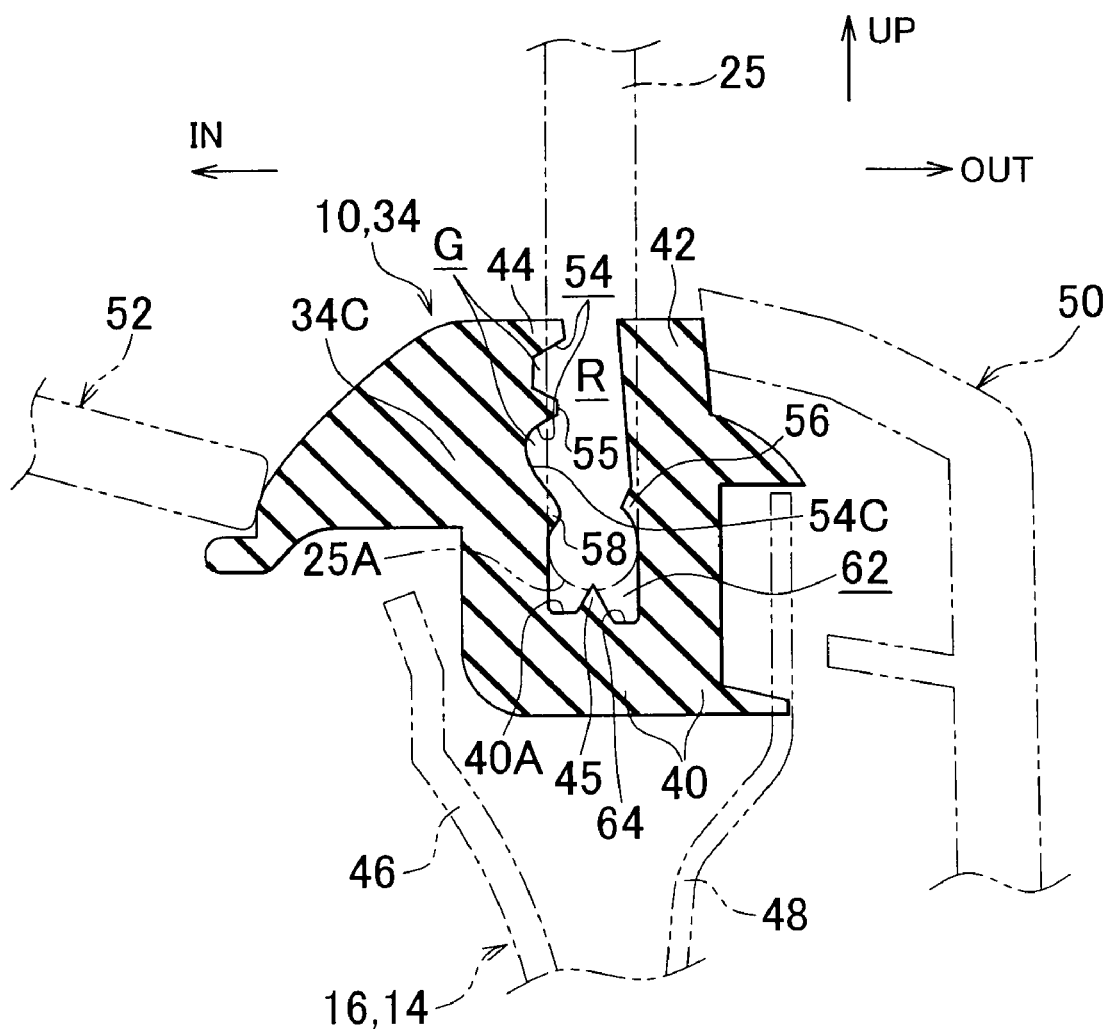
FIG. 2 is a sectional view, taken along the line 2-2 of FIG. 3, showing a main portion of the weather strip according to the embodiment of the invention.

As shown in FIGS. 1 and 2, the frame-like portion 34 has a bottom wall 40, which faces or is in contact with an end face (peripheral surface portion having a width equal to the pane thickness) 25A of the fixed window glass 25. The outer wall 42 extends from an outer edge portion of the bottom wall 40 in the vehicle width direction inwardly with respect to the frame-like portion 34. An inner wall 44 extends from an inner edge portion of the bottom wall 40 with respect to the vehicle width direction so as to face the outer wall 42. The frame-like portion 34 has a C-shaped cross section that is open in the direction of the inner portion of the fixed window glass 25. In the following description, the space surrounded by the bottom wall 40, the outer wall 42 and the inner wall 44 is referred to as the "space R".

In the weather strip 10, as shown in FIG. 3 (illustration of the outer wall 42 is omitted), the bottom wall 40, the outer wall 42, and the inner wall 44 constitute the front portion 34A, the rear portion 34B, the lower portion 34C, and the upper portion 34D of the frame-like portion 34. Thus, the frame-like portion 34 of the weather strip 10 is fitted onto the fixed window glass 25 so that the entire periphery of the fixed window glass 25 is sandwiched between the outer wall 42 and the inner wall 44 in the illustrated example.

As shown in FIG. 2, when the weather strip 10 is in a free condition, the space between the outer wall 42 and the inner wall 44 in the vehicle width direction (the width of the space R) on the free-end (open-end) side is smaller than that on the bottom wall 40 side. The space between the outer wall 42 and the inner wall 44 near the bottom wall 40 (the maximum space) is set substantially equal to the thickness of the fixed window glass 25. Thus, the weather strip 10 is designed so that, when the periphery of the fixed window glass 25 is sandwiched between the outer wall 42 and the inner wall 44, the sealing pressure due to the restoring force of the weather strip 10 occurs.

As shown in FIGS. 1 and 2, a lip 45 is provided in a standing manner at the center portion, with respect to the vehicle width direction, of the bottom wall 40. The lip 45 is designed to be in contact with the end face 25A of the fixed window glass 25 in an elastically deformed state.

FIGS. 1 and 2, which are the sectional views of the lower portion 34C taken along the line 1-1 and the line 2-2 of FIG. 3, illustrate a structure of the lower portion 34C. The lower portion 34C of the frame-like portion 34 is inserted between an inner panel 46 and an outer panel 48, which constitute the side door 14, at the upper edge portion (the belt line portion) of the door body 16. In the example of FIGS. 1 and 2, the member that covers the weather strip 10 (the belt line of the side door 14) from the outside with respect to the vehicle width direction is a door mirror base 50, and the member that covers the weather strip 10 (the belt line of the side door 14) from the inside with respect to the vehicle width direction is a door trim 52.

As shown in the example of FIGS. 1 and 2, the weather strip 10 has a spacing groove 54, which may be regarded as the side groove, the spacing groove 54 being provided in the inner wall 44 and open to the space R. The spacing groove 54 is formed so as to create the space G between the fixed window glass 25 and the inner wall 44 when the frame-like portion 34 is fitted onto the fixed window glass 25. The depth of the spacing groove 54 in a free (non-deformed) condition is set so that, when installed the dimension of the space G in the vehicle width direction (the space between the fixed window glass 25 and the inner wall 44) is equal to or greater than about 1 mm, for example.

By way of example, as shown in FIG. 3, the spacing groove 54 is provided in the part of the inner wall 44 that is a constituent element of the lower portion 34C, along the entire length in the vehicle-body longitudinal direction. In addition, the groove 54 is curved and extends to the portions that are part of the lower end portions of the front portion 34A and the rear portion 34B of the inner wall 44. Specifically, a front end 54A of the spacing groove 54 is curved and extends into the front portion 34A, and a rear end 54B of the spacing groove 54 is curved and extends into the rear portion 34B. The configuration of the spacing groove 54 is not limited to the configuration in which the spacing groove 54 is continuously provided between the limits of the portion of the weather strip 10 in which the spacing groove 54 is provided, but may for example be intermittently provided therebetween.

In this embodiment, a plurality of the spacing grooves 54 (two spacing grooves 54) are arranged in parallel above and below each other (or inside and outside each other). In the illustrated example, a rib 55 is located between the two parallel spacing grooves 54 to divide or separate the spacing grooves 54.

As shown in FIGS. 1 and 2, the weather strip 10 has an outer lip 56, which protrudes from the outer wall 42 toward the inner wall 44, and an inner lip 58, which protrudes from the inner wall 44 toward the outer wall 42. The outer and inner lips 56 and 58, which both function as a lip of the invention in this example, are each provided between the open end (free end of the outer wall 42 and the inner wall 44) of the frame-like portion 34 and the bottom wall 40, more specifically, between the spacing groove 54 and the bottom wall 40. In this embodiment, by way of example, the inner lip 58 protrudes continuously from a lower groove wall 54C of the lower spacing groove 54 (so that the ordinary surface of the inner wall 44 does not exist between the spacing groove 54 and the inner lip 58).

As shown in FIG. 3, the inner lip 58 is provided in the part of the inner wall 44 that is a constituent element of the lower portion 34C, along the entire length in the vehicle-body longitudinal direction, and is also provided in the part of the inner wall 44 that is a constituent element of the front portion 34A, along substantially a majority or the entire length of wall 44 in the height direction with respect to the vehicle body, by way of example. Specifically, a front upper end 58A of the inner lip 58 reaches the vicinity of the upper end of the front portion 34A. On the other hand, a rear end portion 58B of the inner lip 58 reaches the border between the lower portion 34C and the rear portion 34B, and slightly rises. Although the illustration is omitted, the outer lip 56 is provided along substantially the entire length from the front portion 34A to the lower portion 34C so that the outer lip 56 faces the inner lip 58 along the entire length.

In addition, as shown in FIG. 1, the weather strip 10 has a drain hole 60, which is a through hole formed through the bottom wall 40. In this embodiment, the drain hole 60 is mainly constituted of a drain-hole main portion 60A, a drain-hole enlargement portion 60B, and a communicating-hole portion 60C. The drain-hole main portion 60A has a width substantially equal to the width of the part of the bottom wall 40 between the opposed surfaces of the outer wall 42 and the inner wall 44 (that is, the full width in the vehicle width direction) and passes through the bottom wall 40. The drain-hole enlargement portion 60B passes through the bottom wall 40 in the part of the bottom wall 40 under the outer wall 42 in terms of the height direction with respect to the vehicle body. The communicating-hole portion 60C allows the drain-hole enlargement portion 60B to communicate with the space R. The communicating-hole portion 60C can be formed, for example, by cutting away a lower end portion of the outer wall 42.

Thus, the drain hole 60 (the drain-hole enlargement portion 60B and the communicating-hole portion 60C) is located offset outward in the vehicle width direction with respect to the fixed window glass 25. As shown in FIG. 3, a plurality of the drain holes 60 (two drain holes 60 in the illustrated example) are formed in the bottom wall 40 that is a constituent element of the lower portion 34C. The drain holes 60 are spaced apart from each other in the vehicle-body longitudinal direction in the illustrated example.

In addition, the weather strip 10 has a drain groove 62, which serves as a bottom groove for allowing the part of the space R that is offset in the vehicle-body longitudinal direction with respect to the drain hole 60 to communicate with the drain hole 60 when the frame-like portion 34 of the weather strip 10 is fitted onto the fixed window glass 25. In the illustrated example, the drain groove 62 is made by forming the weather strip 10 so that the portion of the weather strip 10 on the outer side of the lip 45 in the vehicle width direction has a depth greater than that of the portion of the weather strip 10 on the inner side of the lip 45 in the vehicle width direction. Specifically, in this embodiment, the drain groove 62 is provided in the bottom wall 40 in the form of a concave portion such that the drain groove 62 is open toward the inside of the frame-like portion 34 (open in the upward direction of the height direction with respect to the vehicle body in the front portion 34A). The depth of the drain groove 62 is set equal to or greater than about 1 mm, by way of example.

More specifically, the outer wall 42 and the lip 45 are the walls of the drain groove 62, and the drain groove 62 has a groove bottom surface 64 that is positioned lower than a bottom surface 40A of the bottom wall 40 (more distant from the free ends of the outer wall 42 and the inner wall 44). The drain groove 62 is configured so that the communicating-hole portion 60C of the drain hole 60 communicates with the drain groove 62 from the outer side with respect to the vehicle width direction, in other words, so that the upper end portion of the drain-hole enlargement portion 60B in the height direction with respect to the vehicle body directly communicates with the drain groove 62 from the outer side with respect to the vehicle width direction. Said in a different way, the communicating-hole portion 60C is open to the space R through the drain groove 62.

As shown in example of FIG. 3, the drain groove 62 is provided in the part of the inner wall 44 that is a constituent element of the lower portion 34C, along the entire length in the vehicle-body longitudinal direction, and is also provided in the part of the inner wall 44 that is a constituent element of the front portion 34A, along the entire length in the height direction with respect to the vehicle body. Specifically, a front upper end 62A of the drain groove 62 reaches the upper end of the front portion 34A. On the other hand, a rear end portion 62B of the drain groove 62 reaches the border between the lower portion 34C and the rear portion 34B, and slightly rises.

Next, operation of this embodiment will be described.

In the automobile A in which the weather strip 10 configured as described above is used, the weather strip 10 provides sealing between the periphery of the fixed window glass 25 and the frame-like portion surrounding the window opening 22, with the frame-like portion being formed of the door body 16, the door frame 18 and the division bar 20 of the side door 14.

In the weather strip 10, the outer lip 56 and the inner lip 58 are provided on the outer wall 42 and the inner wall 44, respectively, which constitute the frame-like portion 34, so that the weather strip 10 is brought into contact with the fixed window glass 25 at the outer lip 56 and the inner lip 58 at a high contact pressure. Thus, the weather strip 10 exhibits a high degree of sealing in relation to the fixed window glass 25 in the portion in which the outer lip 56 and the inner lip 58 are provided (mainly the front portion 34A and the lower portion 34C in this embodiment). Thus, in the automobile A in which the weather strip 10 is used, the entrance of water from the outside to the inside of the vehicle through the interface between the fixed window glass 25 and the weather strip 10 is avoided or minimal.

In addition, the drain hole 60 is formed in the bottom wall 40, which is a constituent element of the lower portion (the lower portion with respect to the gravity direction) of the frame-like portion 34, that is, the lower portion 34C, so that it is possible to drain the water downward (into the outside of the vehicle through the door body 16) that enters through the interface between the fixed window glass 25 and the outer wall 42. In particular, the weather strip 10 has the drain groove 62 that is elongated along the circumferential direction of the frame-like portion 34 and communicates with the drain hole 60, so that it is possible to lead the water that enters some areas in the portion in which the drain groove 62 is provided to the drain hole 60 and to efficiently drain the water through the drain hole 60. In addition, at least part of the drain hole 60 is provided offset outward in the vehicle width direction with respect to the fixed window glass 25, so that the drain hole 60 is not closed by the end face of the fixed window glass 25, which ensures drainage. Further, the drain groove 62 is offset outward in the vehicle width direction, so that the water that enters through the interface between the outer wall 42 and the fixed window glass 25 is quickly drained through the drain groove 62 or directly from the drain hole 60.

In addition, in the weather strip 10, the drain groove 62 is provided (opened) in the bottom wall 40 partially with respect to the width direction between the outer wall 42 and the inner wall 44, so that, even when the end face 25A of the fixed window glass 25 is brought into contact with the bottom surface 40A of the bottom wall 40, the drain groove 62 is not closed. Moreover, because the drain hole 60 has the drain-hole enlargement portion 60B and the communicating-hole portion 60C, even when the end face 25A of the fixed window glass 25 is brought into contact with the bottom surface 40A of the bottom wall 40, the drain hole 60 is not closed by the fixed window glass 25. Thus, with the weather strip 10, it is possible to more efficiently drain the water that enters through the interface between the fixed window glass 25 and the outer wall 42.

Furthermore, in the weather strip 10, the spacing groove 54 is formed mainly in the inner wall 44 that is a constituent element of the lower portion 34C of the frame-like portion 34, so that, when water exists between the fixed window glass 25 and the inner wall 44, the water is prevented from rising in the interface between the fixed window glass 25 and the inner wall 44, due for example to capillarity, and entering the inside or passenger compartment.

In this way, with the weather strip 10 according to this embodiment of the invention, it is possible to efficiently prevent water from entering inside the vehicle through the interface between the weather strip 10 and the fixed window glass 25. Thus, in the automobile A in which the weather strip 10 is used, it is possible to efficiently suppress or prevent the occurrence of adhesion of dirt on the passenger compartment side due to the lack in sealing by the weather strip 10 as described below.

Figure 6:
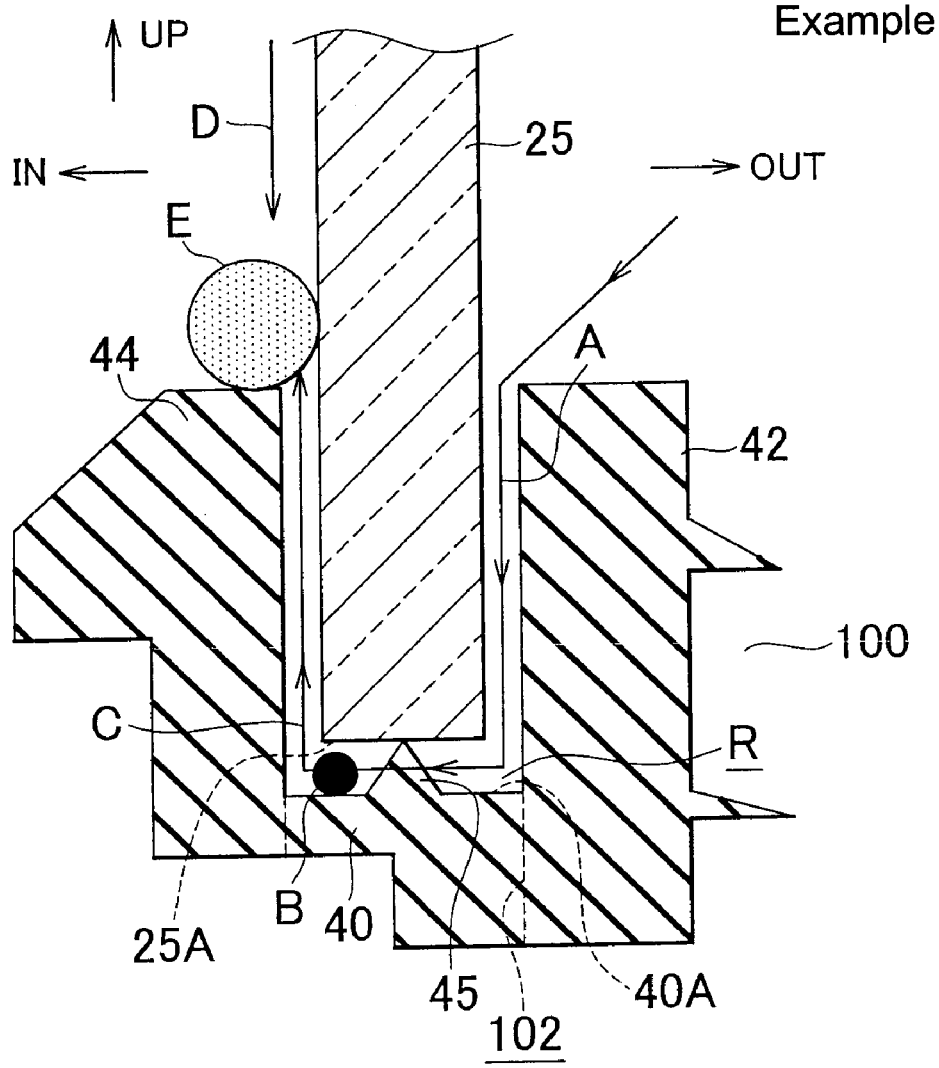
FIG. 6 is a sectional view schematically showing a channel through which salt water enters, in a weather strip according to a comparison example in relation to the embodiment of the invention.

As shown in FIG. 6, for example, in the weather strip 100 according to a comparison example that does not have the spacing groove 54, the outer lip 56, the inner lip 58, the drain hole 60 and the drain groove 62, sealing is provided mainly by bringing a free-end portion of the outer wall 42 into pressure contact with the fixed window glass 25 and bringing the lip 45 into elastic contact with the end face 25A of the fixed window glass 25, and the water that enters through a through hole 102 is drained. In the automobile A provided with such a weather strip 100, a phenomenon can occur in which salt (dirt) adheres to the periphery of the fixed window glass 25 on the inner, passenger compartment side when the automobile A runs in the environment where a snow-melting salt is sprinkled on the road in a cold district, for example.

Specifically, because the weather strip 100 is configured to provide sealing in relation to the fixed window glass 25 at the free end of the outer wall 42, when the free end of the outer wall 42 comes off the fixed window glass 25 due to high pressure washing and/or the air flow caused when the vehicle is running, for example, the sealing effect at the interface between the fixed window glass 25 and the outer wall 42 is deteriorated, and water enters the space R through the interface between the fixed window glass 25 and the outer wall 42 as shown by the arrow A in FIG. 6. In addition, in the lip 45, the unevenness in accuracy and the surface roughness of the end face 25A of the fixed window glass 25 are large, and it is difficult to achieve sufficient sealing performance. Thus, the water that enters through the interface between the fixed window glass 25 and the outer wall 42 reaches the area on the inner wall 44 side of the lip 45.

In addition, because the weather strip 100 has a structure in which the through holes 102 and the space R (the space between the bottom surface 40A of the bottom wall 40 and the end face 25A of the fixed window glass 25) that connects the through holes 102 tend to be closed by the fixed window glass 25 compressing the lip 45, it is difficult to drain the water that enters the space R. Thus, on the bottom wall 40 of the weather strip 100 (especially on the bottom wall 40 that is the lower portion with respect to the gravity direction), water collects as shown by the reference letter B in FIG. 6.

The water that remains between the weather strip 100 and the fixed window glass 25 in the area on the inner wall 44 side of the lip 45 rises in the interface between the fixed window glass 25 and the inner wall 44 due to capillarity as shown by the arrow C in FIG. 6, and oozes out at the free-end portion of the inner wall 44. In addition, condensation easily occurs on the inside surface of the fixed window glass 25 due to the difference in temperature between the inside and the outside of the passenger compartment under low temperature conditions where a snow-melting salt is sprinkled. When the water formed by condensation enters the interface between the fixed window glass 25 and the inner wall 44 as shown by the arrow D in FIG. 6, the above-mentioned capillary action is promoted.

When the water (hereinafter referred to as "salt water") in which the snow-melting salt that adhered to the outer surface of the vehicle body is dissolved enters into the vehicle from the outside as described above, that is, when the water flows into the interface between the free-end portion of the inner wall 44 of the weather strip 100 and the fixed window glass 25, the salt water is dried at the portion that is exposed on the passenger compartment side, and the salt is crystallized as shown by the reference symbol E in FIG. 6. In addition, the crystallization of salt causes a gap between the inner wall 44 and the fixed window glass 25, and the gap further causes salt water to be introduced and causes the salt crystal to grow. Thus, the salt, that is, dirt adheres to the fixed window glass 25 on the inner, passenger compartment side.

On the other hand, in the weather strip 10, the outer lip 56 is provided between the free-end portion of the outer wall 42 and the bottom wall 40, so that, even when the free-end portion of the outer wall 42 comes off the fixed window glass 25 due to high pressure washing and/or the air flow caused when the vehicle is running, sealing effect at the interface between the fixed window glass 25 and the outer wall 42 is maintained by virtue of the outer lip 56 that is provided at the position where the influence of high pressure washing or the air flow caused when the vehicle is running is small.

In addition, the weather strip 10 is provided with the drain hole 60 and the drain groove 62 that are not closed by the fixed window glass 25 as described above, so that the water that enters the space R is quickly drained. In particular, the drain hole 60 and the drain groove 62 both have a portion offset to the outer wall 42 side, so that it is possible to more quickly drain the water that enters through the interface between the outer wall 42 and the fixed window glass 25. In this way, it is possible to effectively prevent water from collecting between the fixed window glass 25 and the bottom wall 40 (reduce the amount of water collecting).

In addition, in the weather strip 10, the spacing groove 54 is provided in the inner wall 44, so that it is possible to effectively prevent the water that collects between the fixed window glass 25 and the bottom wall 40 from being led to the free end side of the outer wall 42 due for example to capillarity. In addition, because the inner lip 58 is provided on the inner wall 44, the channel through which water rises due to capillarity and the channel through which the water formed by condensation on the inner surface of the fixed window glass 25 descends are prevented from being connected with each other, and it is therefore possible to effectively prevent the condensed water from promoting capillary action as described above.

As described above, in the automobile A in which the weather strip 10 is used, the entrance of water through the interface between the fixed window glass 25 and the weather strip 10 is effectively prevented, and the water that enters is efficiently drained, so that the adhesion of dirt on the inside or passenger compartment side due to lack in the degree of sealing around the fixed window glass 25 in the environment where a snow-melting salt can adhere to the outer surface of the vehicle body is effectively suppressed or prevented.

Although, in the above description of the embodiment, an example has been described in which the portion of the weather strip 10 in which the spacing groove 54, the outer lip 56, the inner lip 58, the drain hole 60 and the drain groove 62 are provided is the portion as shown in FIG. 3, the invention is not limited to this embodiment. The portion in which these elements are provided may be appropriately set depending on the required performance based on the vehicle type and/or specifications, for example. Thus, part or all of the spacing groove 54, the outer lip 56, the inner lip 58, the drain hole 60, and the drain groove 62 may be provided all around the frame-like portion 34. In a weather strip 10 for the fixed window glass 30, the portion in which the spacing groove 54, the outer lip 56, the inner lip 58, the drain hole 60, and the drain groove 62 are provided may be different from that in the case of the weather strip 10 for the fixed window glass 25 (the arrangement may be reversed in the longitudinal direction, for example).

Although in the above description of the embodiment, an example has been described in which the weather strip 10 is used for the window openings 22 and 28 of the side doors 14, the invention is not limited to this embodiment. The weather strip 10 may be used with the fixed window glass that closes the window opening formed in a vehicle body or a tailgate, for example.

In addition, although, in the above description of the embodiment, an example has been described in which the weather strip 10 has the spacing groove 54, the outer lip 56, the inner lip 58, the drain hole 60, and the drain groove 62, the invention is not limited to this embodiment. For example, an arrangement could be provided in which the weather strip 10 has portions of a subset of the elements of the spacing groove 54, the outer lip 56, the inner lip 58, the drain hole 60, and the drain groove 62.

Obviously, numerous modifications and variations of the present invention are possible in light of the above teachings. It is therefore to be understood that within the scope of the appended claims, the invention may be practiced otherwise than as specifically described herein.

What is claimed is:

1. A weather strip structure comprising:
    a bottom wall that faces or is in contact with an end face of a window glass that is fixedly held in a position such that a window opening of a vehicle body is closed;
    an outer wall that extends from the bottom wall on an outer side of the vehicle body with respect to the window glass;
    an inner wall that extends from the bottom wall on an inner side of the vehicle body with respect to the window glass so that the inner wall and the outer wall sandwich a peripheral portion of the window glass in a thickness direction;
    a first side groove which is provided in the inner wall and which provides a first gap space enclosed by a side face of the window glass and the inner wall;
    a first lip that is provided on the inner wall, and wherein the first lip protrudes, on a side of the inner wall, the side facing the window glass; and
    a second side groove which is disposed on the inner wall and which provides a second gap space enclosed by the side face of the window glass and the inner wall, such that the first lip is disposed between the first and second side grooves; and
    wherein a portion of the inner wall that is located above the first side groove contacts the side face of the window glass, and a portion of the inner wall that is located above the second side groove contacts the side face of the window glass, so that the first gap space and the second gap space are isolated from a space in a vehicle cabin.

2. The weather strip structure according to claim 1, wherein the first side groove is provided in the inner wall in a lower portion of the weather strip structure, the lower portion sandwiching, in the thickness direction, a lower edge portion, with respect to a height direction of a vehicle body, of the window glass by the inner wall and the outer wall.

3. The weather strip structure according to claim 1, wherein the first lip is provided between one of the first and second side grooves and the bottom wall.

4. The weather strip structure according to claim 1, further comprising a through hole passing through the bottom wall in a lower portion of the weather strip structure, the lower portion sandwiching a lower edge portion, with respect to a height direction of the vehicle body, of the window glass by the inner wall and the outer wall.

5. The weather strip structure according to claim 4, wherein the through hole is at least partially offset with respect to the window glass toward an outside of the vehicle body.

6. The weather strip structure according to claim 4, further comprising a bottom groove that is provided in the bottom wall, wherein the bottom groove is open in a direction toward an end face of the window glass, and communicates with the through hole.

7. The weather strip according to claim 6, wherein the bottom groove is offset with respect to a center portion of the window glass in the thickness direction of the window glass toward an outside of the vehicle body.

8. The weather strip structure according to claim 6, further comprising a second lip that is provided on a central portion of the bottom wall in a vehicle width direction, wherein the bottom groove is provided on an outer side of the vehicle body with respect to the second lip and is offset toward an outside of the vehicle body.

9. The weather strip structure according to claim 4, wherein a thickness of the through hole in a vehicle width is wider than a thickness of the window glass in the vehicle width direction.

10. The weather strip structure according to claim 1, wherein at least one of the first and second side grooves has a depth of at least 1 mm.

11. The weather strip structure according to claim 1, further comprising a second lip that is provided on a central portion of the bottom wall in a vehicle width direction, wherein the portion of the weather strip on the outer side of the second lip in the vehicle width direction has a depth greater than that of the portion of the weather strip on the inner side of the second lip in the vehicle width direction.

12. The weather strip structure according to claim 1, further comprising a third lip provided between the bottom wall and one of the first side groove and the second side groove, which is at a lower position than the other of the first side groove and the second side groove.

13. A weather strip structure comprising:
a bottom wall that faces or is in contact with an end face of a window glass that is fixedly held in a position such that a window opening of a vehicle body is closed;
an outer wall that extends from the bottom wall on an outer side of the vehicle body with respect to the window glass;
an inner wall that extends from the bottom wall on an inner side of the vehicle body with respect to the window glass so that the inner wall and the outer wall sandwich a peripheral portion of the window glass in a thickness direction;
wherein the bottom wall includes a first portion and a second portion, and wherein a groove is provided in said second portion, and further wherein at least part of said groove is spaced further from said window glass than at least part of said first portion such that if said window glass contacts said at least part of said first portion a space is maintained between said window glass and said bottom wall in said groove; and
a through hole that passes through said weather strip, wherein said through hole is in communication with said groove;
wherein said inner and outer walls sandwich said window glass in a thickness direction at least first and second locations, and wherein said second location is closer to said bottom wall than said first location with respect to a height direction of the vehicle;
wherein said inner wall includes a first side groove to provide a first gap space enclosed by the inner wall and a side face of the window glass at a position between said first and second locations; and
wherein a second side groove is disposed on the inner wall to provide a second gap space enclosed by the side face of the window glass and the inner wall, and a lip is disposed between the first and second side grooves; and
wherein a portion of the inner wall that is located above the first side groove contacts the side face of the window glass, and a portion of the inner wall that is located above the second side groove contacts the side face of the window glass, so that the first gap space and the second gap space are isolated from a space in a vehicle cabin.

14. The weather strip structure according to claim 13, wherein at least one of the first and second side grooves has a depth of at least 1 mm.

15. The weather strip structure according to claim 13, wherein a thickness of the through hole in a vehicle width direction is wider than a thickness of the window glass in the vehicle width direction.

16. The weather strip structure according to claim 13, further comprising a second lip that is provided on a central portion of the bottom wall in a vehicle width direction, wherein the portion of the weather strip on the outer side of the second lip in the vehicle width direction has a depth greater than that of the portion of the weather strip on the inner side of the second lip in the vehicle width direction.

17. The weather strip structure according to claim 13, wherein the weather strip structure is disposed between an inner panel of a vehicle and an outer panel of a vehicle, and water is discharged to a space between the inner panel and the outer panel through the through hole.

\* \* \* \* \*